Sept. 25, 1962 — R. A. ALLEN — 3,055,334

CLEATS

Filed Sept. 25, 1959

INVENTOR.
RUDOLPH A. ALLEN
BY Reynolds, Beach
+ Christensen
ATTORNEYS 3,055,334
CLEATS
Rudolph A. Allen, 1505 Hallinan, Oswego, Oreg.
Filed Sept. 25, 1959, Ser. No. 842,252
6 Claims. (Cl. 114—218)

The cleat of this invention is one intended specifically for use in a cargo-securing system such as is disclosed in my Patent No. 2,723,631, dated November 15, 1955. In that system cargo within a hold, resting upon two layers of dunnage planks, and surrounding the square of the hold, is secured by lines which extend generally uprightly between pad-eyes welded to the deck and to the overhead structure. The deck-mounted pad-eyes were necessarily of minimum height, so that they would not project above the upper surface of the dunnage, some one and a half inches above the deck, where they would obstruct the movement of wheeled fork-lift trucks or the like, or be likely to damage from such trucks or like causes. It was then felt to be necessary to use flat pad-eye-engaging members, reeved upon the line, to engage the pad-eyes. The pad-eye-engaging members were not easy to engage, beneath the dunnage, they added weight and expense to the system, and restricted the flexibility of the system.

The present invention consists of a cleat which in use is welded to the deck, with which the line is directly engaged in the usual manner that lines are engaged with cleats, so that no additional members on the line are needed, and a given line can be used in any of various situations, but which is still of no greater height than the dunnage. In addition the cleat is so shaped that it is adequately strong, and well protected in all its parts against damage even should it be contacted by a loaded vehicle, each part reinforcing other parts, and it is so formed that it will avoid wear on the line, yet will secure a line that extends upward in almost any direction or angle. The same cleat may also be used overhead and except as it then need not be of minimum height, and is not subject to vehicle loads, in overhead use it possesses many of the advantages outlined above.

The drawings ilustrate a form of cleat having the properties indicated, and the environment in which the cleat is used. Its structure and advantages will be explained in detail herein, and its novel features will be set forth in the claims.

Figure 1:
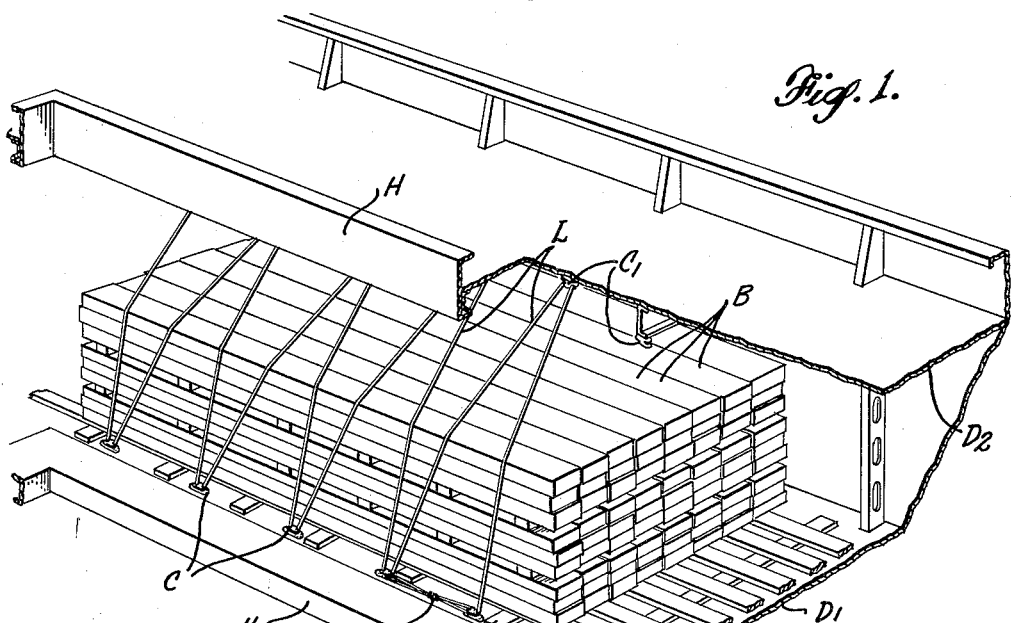
FIGURE 1 is a general isometric view of a portion of a hold, showing the cleat as used according to the arrangement of my patent for securing cargo.
Figure 2:
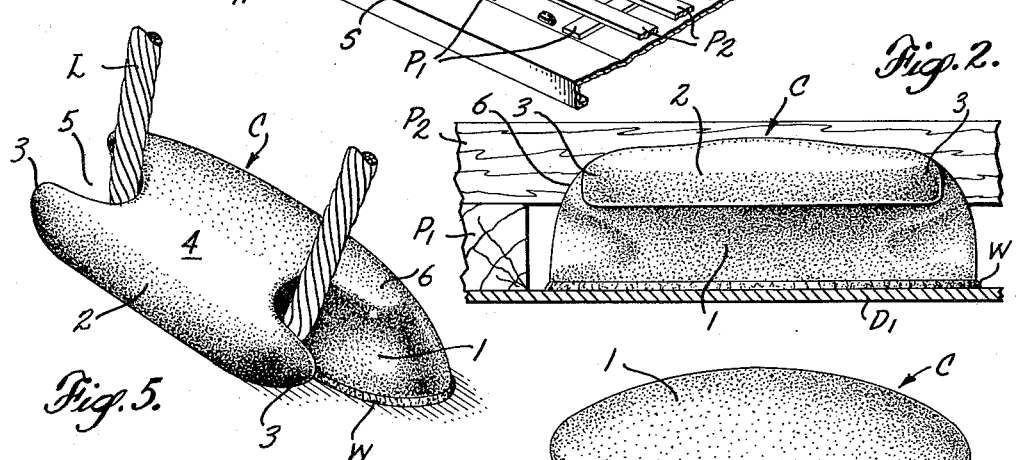
FIGURE 2 is an elevational view, looking towards the retaining side of a cleat of this invention.
Figure 5:
FIGURE 5 is an isometric view of the cleat, in use.

Referring first to FIGURE 1, a cargo of boards B is shown stowed upon the commonly used crossed dunnage planks P1, P2 resting upon the deck D1, the whole lying beneath the deck D2, surrounding the square of the hatch H. The system is, of course, applicable to almost any type of bulk cargo, of which the boards B are merely representative. The cargo is secured by lines or a line L extending back and forth between lower cleats C and upper cleats C1 affixed to the respective decks or deck structure D1, D2, with the line drawn taut and secured at S. The upper cleats C1 are farther from the hatch H than the lower cleats C, so that the line L will engage and bend over the upper edge of the cargo, to hold the latter more securely against separation.

The dunnage planks are usually nominal one-inch boards (actually ¾ inch thick) laid in crossing relation, to maintain the cargo above the deck by a minimum distance, which is about one and one-half inches for the combined two layers. This sets the limit to the height of the cleats. Cargo is frequently handled, within holds, by fork-lift trucks or like vehicles, and it is undesirable to have cleats or other obstructions rise above the dunnage level in the path of such vehicles. Not only would such projecting cleats hinder free movement of the vehicle, but since the cleats are located near the square of the hatch, at the inboard limit of the dunnage, occasional contact of wheels with cleats is inevitable, and the cleats must be protected by their submergence beneath the dunnage level from such contact to the maximum degree, and in addition must be of such overall shape as to be least likely to be strained when contact does occur, and adequately strong to resist breakage upon contact. The cleat of this invention is designed to achieve these objects.

Minimum vertical height is achieved in part by eliminating any base plate for securement to the deck, using the stout base portion 1 in direct contact with the deck and welded thereto, at W. Also, the horned terminus of the cleat is bent over, at 2, so that it is substantially parallel to and projects beyond the base portion 1 over the deck rather than being directed uprightly away therefrom; see FIGURE 4. The terminus 2 is formed with two opposite horns 3, and joins the base portion 1 by a longitudinally reduced neck 4, the upper surface whereof is rounded as viewed end-on, and joins the rounded upper surface of the body portion 1, as seen in FIGURE 4.

Figure 3:
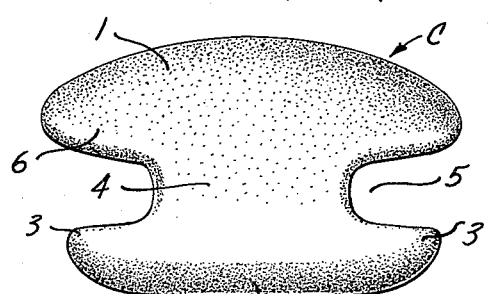
FIGURE 3 is a plan view of the cleat.

The notches 5 between the horns 3 and the body portion 1 are defined, opposite each horn, by upstanding shoulders 6, so that the body portion is of material height throughout its length, and the shoulders rather than the horns 3 assume loads near the ends of the body. The body portion is, however, rounded exteriorly, as seen in plan, FIGURE 3, and the exterior edges of the horns 3 are rounded inwardly at their ends. Such provisions assure adequate strength even to the ends of the cleat and its horns, and eliminate points where stress may be concentrated should a wheel R of a vehicle come into contact with a cleat.

Figure 4:
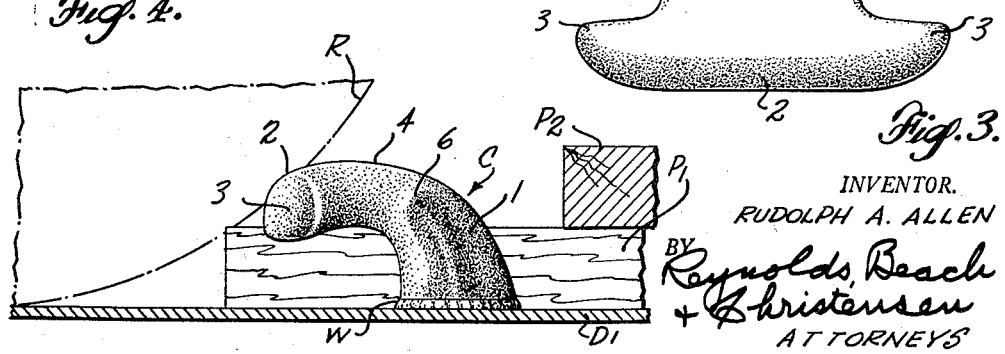
FIGURE 4 is an end elevation of the cleat in relation to the dunnage and deck.

The under side of the neck 4 is concavely rounded, see FIGURE 4, and all interior edges of the notches 5 are likewise rounded, for retention of a line L engaged therewith, yet without wear on the line regardless of the direction of tension in the line.

The combined result of these contours is to form the cleat, so far as possible, rounded somewhat as a hemisphere, the better to resist strain when contacted by a wheel R, from any direction or aspect, and to afford inherent reinforcement by its shape against damage as a result of such contact. It must, of course, depart from hemispherical shape in order to function as a cleat, but otherwise it is of the near-hemispherical shape for maximum strength, and of course, for minimum height.

The cleats are installed permanently, and when cargo is to be secured a line is extended back and forth, up and down, between cleats, and its end is secured at S. Whatever direction the line runs from a cleat, it is well retained in engagement by the shape of the cleat. There being no hooks nor like elements reeved on the line, the line may be used over and over, without restriction as to length, and can be quite easily engaged with the successive cleats. When vehicles roll over the deck and dunnage the cleats are mostly below the level where they are likely to be contacted, but if contact occurs the shape of the cleat is such as to afford it the maximum strength, and inherent reinforcement against damage, and the maximum avoidance of stress concentration at a potentially weak point. At the same time, being rounded, it avoids contact to a high degree.

I claim as my invention:

1. A cleat for securing lines which extend generally in an upright direction, to a deck, said cleat including an elongated body including a base portion directed uprightly from a lower deck-contacting surface, one side and the upper surface of the body being curved in cross-section at its median plane from the deck-contacting surface continuously towards the opposite side to a point laterally beyond the deck-contacting surface, a longitudinally narrowed neck joining the body at such point and projecting laterally above the deck-contacting surface, but not higher than the highest point of the base portion, a terminus projecting laterally from the neck in the same direction, and also spaced above the deck-contacting surface, horns directed in opposite longitudinal directions on said terminus, the ends of the upper portion of the body terminating in shoulders facing the horns, and at least of equal length and height to the horns, the shoulder-facing portions of the horns substantially paralleling the shoulders, to define opposite line-receiving notches, and the surfaces of said notches and the under surface of the neck being smoothly contoured where they will engage a line.

2. A cleat as in claim 1, wherein the transversely curved upper and side surface of the body is also convexly curved longitudinally in plan.

3. A cleat as in claim 1, wherein the under surface of the neck is shallowly grooved longitudinally.

4. A cleat as in claim 1, wherein the tips of the horns are rounded from their sides which are distant from the body, towards the entrances to the notches.

5. A deck cleat for securing a line extending in a direction generally away from the deck, said cleat comprising a body portion provided with a substantially planar base surface superimposable upon a deck, said body portion having an elongated side wall disposed uprightly in relation to said surface, with its length dimension extending generally parallel to such surface, a neck portion projecting laterally from the side wall in a direction generally parallel to such surface from a relative location on said side wall adjacent the top and intermediate the ends thereof, said projecting neck portion having an elongated cross section of lesser length and width than the length and width respectively of the side wall and having its length dimension extending generally parallel to such surface, whereby the side wall presents a bottom shoulder surface extending below, and opposite end shoulder surfaces extending beyond each end of the neck, and an elongated head portion joined intermediate its ends to the projecting end of the neck in transverse relation to the direction of projection of such neck, opposite ends of such head portion projecting lengthwise beyond the neck sides in generally parallel spaced relation to the respective end shoulder surfaces, to define in conjunction therewith and with the neck two oppositely directed line-receiving slots having open sides facing transversely to said surface and through either or both of which the line may be passed, said body, neck and head portions having upper surface areas which lie in successively contiguous relationship generally parallel to the base surface plane.

6. The cleat defined in claim 5, wherein the lower surface of the head portion intermediate its ends lies below the neck portion.

References Cited in the file of this patent

UNITED STATES PATENTS

| 2,136,014 | McDonald | Nov. 8, 1938 |
| 2,836,141 | Brydon | May 27, 1958 |
| 2,873,499 | Bartholomew | Feb. 17, 1959 |

FOREIGN PATENTS

| 69,769 | Sweden | May 2, 1929 |